United States Patent
Goto et al.

(10) Patent No.: US 11,695,115 B2
(45) Date of Patent: Jul. 4, 2023

(54) POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicants: Panasonic Corporation, Kadoma (JP); TOYOTA JIDOSHA KABUSHIKI KAISHA, Toyota (JP)

(72) Inventors: Natsumi Goto, Hyogo (JP); Takashi Ko, Osaka (JP); Shinya Suzuki, Hyogo (JP); Fumiharu Niina, Hyogo (JP); Sho Tsuruta, Osaka (JP); Ryo Hanazaki, Toyota (JP)

(73) Assignees: PANASONIC HOLDINGS CORPORATION, Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 234 days.

(21) Appl. No.: 17/081,310

(22) Filed: Oct. 27, 2020

(65) Prior Publication Data

US 2021/0135214 A1    May 6, 2021

(30) Foreign Application Priority Data

Oct. 30, 2019 (JP) .............................. JP2019-197351

(51) Int. Cl.
| | |
|---|---|
| *H01M 4/525* | (2010.01) |
| *H01M 4/505* | (2010.01) |
| *H01M 10/0525* | (2010.01) |
| *H01M 4/36* | (2006.01) |
| *H01M 4/02* | (2006.01) |

(52) U.S. Cl.
CPC ............ *H01M 4/525* (2013.01); *H01M 4/364* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2014/0162132 A1 | 6/2014 | Ishii et al. | |
| 2019/0074513 A1* | 3/2019 | Ham | H01M 4/505 |

FOREIGN PATENT DOCUMENTS

| | | |
|---|---|---|
| JP | 2013-137947 A | 7/2013 |
| JP | 2014-116111 A | 6/2014 |

* cited by examiner

*Primary Examiner* — Jonathan Crepeau
*Assistant Examiner* — Angela J Martin
(74) *Attorney, Agent, or Firm* — WHDA, LLP

(57) ABSTRACT

A positive electrode active material for a non-aqueous electrolyte secondary battery according to a configuration includes a lithium-transition metal composite oxide containing nickel (Ni) in an amount of greater than or equal to 80 mol %, in which boron (B) is present at least on a particle surface of the lithium-transition metal composite oxide. In the lithium-transition metal composite oxide, when particles having a larger particle size than a volume-based 70% particle size (D70) are first particles and particles having a smaller particle size than a volume-based 30% particle size (D30) are second particles, a coverage ratio of B on surfaces of the second particle is larger than a coverage ratio of B on surfaces of the first particle by 5% or greater.

7 Claims, 1 Drawing Sheet

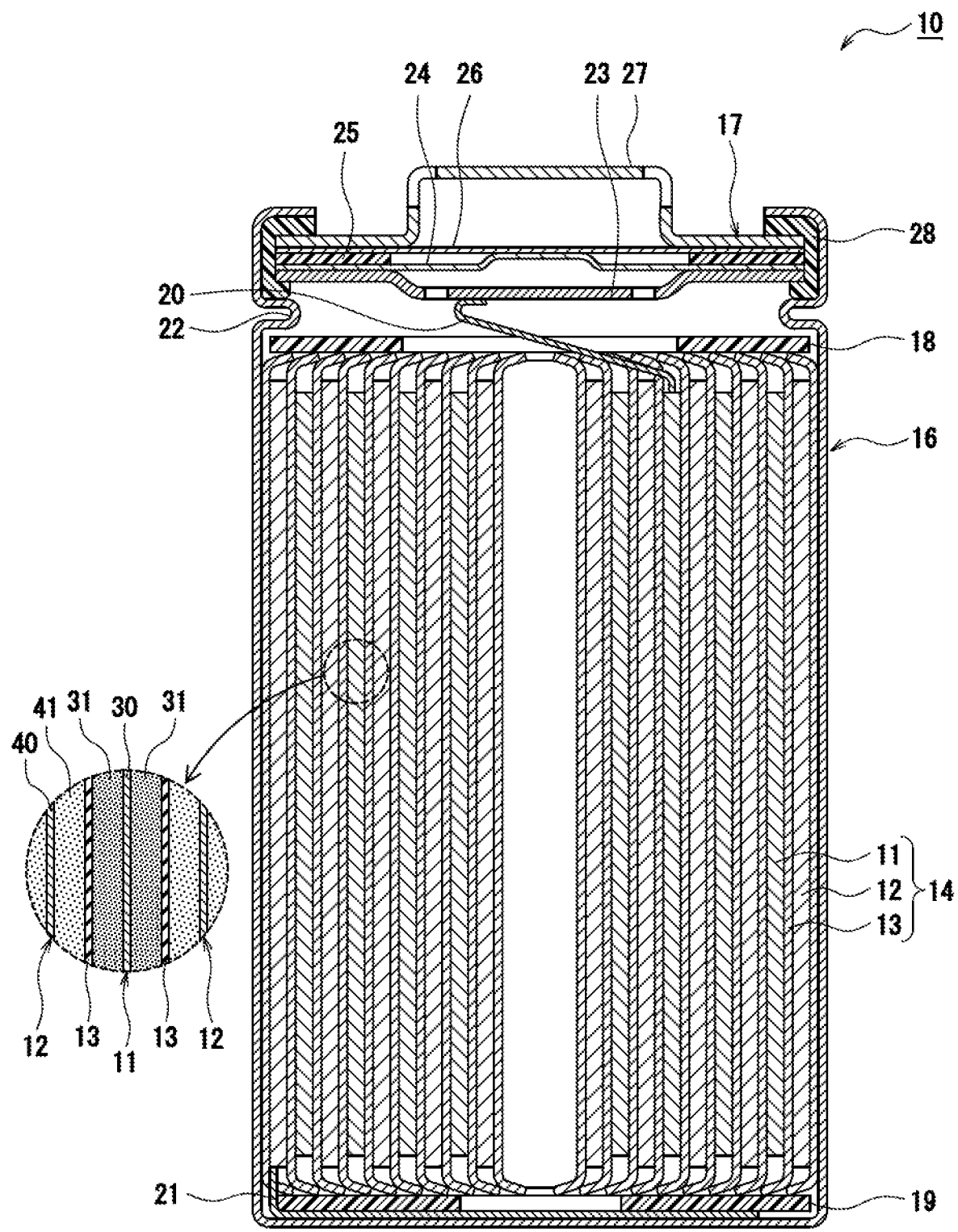

POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

This application claims priority to Japanese Patent Application No. 2019-197351 filed on Oct. 30, 2020, which is incorporated herein by reference in its entirety including the specification, claims, drawings, and abstract.

TECHNICAL FIELD

The present disclosure relates to a positive electrode active material for a non-aqueous electrolyte secondary battery, and to a non-aqueous electrolyte secondary battery, and in particular to a positive electrode active material including a lithium-transition metal composite oxide having a large Ni content, and to a non-aqueous electrolyte secondary battery which uses the active material.

BACKGROUND ART

In recent years, lithium-transition metal composite oxides having a large Ni content have attracted much attention as positive electrode active materials of a high energy density. For example, Patent Literature 1 discloses a positive electrode active material in which a layer of an inorganic oxide such as boron oxide is provided in at least a portion of a particle surface of a lithium-nickel composite oxide. Patent Literature 1 discloses that the use of the positive electrode active material can inhibit reduction of an initial battery capacity due to an increase in resistance.

Patent Literature 2 discloses a positive electrode active material in which surfaces of a portion of primary particles of a lithium-nickel composite oxide are covered by a layer of a lithium metal oxide such as lithium metaborate, and surfaces of the remaining primary particles are covered by a layer of a cubic crystal metal oxide such as nickel oxide. Patent Literature 2 discloses that, with the use of the positive electrode active material, a secondary reaction with a non-aqueous electrolyte solution can be inhibited, and a cycle characteristic and a rate characteristic can be improved.

CITATION LIST

Patent Literature

PATENT LITERATURE 1: Japanese Unexamined Patent Application Publication No. 2014-116111
PATENT LITERATURE 1: Japanese Unexamined Patent Application Publication No. 2013-137947

In a lithium-transition metal composite oxide having a large Ni content, an average valance of Ni tends to become high during charging, and discharge of oxygen tends to occur more frequently due to a secondary reaction with the electrolyte. Thus, there remains a problem in heat endurance characteristic during occurrence of abnormality of the battery. In particular, because a composite oxide of a small particle size easily reacts with the electrolyte due to a large specific surface area per unit mass, such a composite oxide has a low heat endurance characteristic.

Further, with a provision of a boron compound on the particle surface of the positive electrode active material, inhibition of the secondary reaction between the active material and the electrolyte can be expected, which subsequently results in improvement of the heat endurance characteristic. However, in this case, the boron compound becomes a resistance layer, which would degrade the rate characteristic. In the techniques of Patent Literature 1 and Patent Literature 2, there remains room for improvement in terms of the heat endurance characteristic and the rate characteristic of the battery.

An advantage of the present disclosure lies in provision of a positive electrode active material of a high energy density including a lithium-transition metal composite oxide having a large Ni content, which can contribute to improvement of the heat endurance characteristic while maintaining superior rate characteristic of the non-aqueous electrolyte secondary battery.

SUMMARY

According to one aspect of the present disclosure, there is provided a positive electrode active material for a non-aqueous electrolyte secondary battery, including: a lithium-transition metal composite oxide containing nickel (Ni) in an amount of greater than or equal to 80 mol % with respect to a total number of moles of metal elements other than lithium (Li), wherein boron (B) is present at least on a particle surface of the lithium-transition metal composite oxide, and, the lithium-transition metal composite oxide includes first particles having a larger particle size than a volume-based 70% particle size (D70) and second particles having a smaller particle size than a volume-based 30% particle size (D30). A coverage ratio of B on surfaces of the second particles is larger than a coverage ratio of B on surfaces of the fast particles by 5% or greater.

According to another aspect of the present disclosure, there is provided a non-aqueous electrolyte secondary battery including: a positive electrode having the above-described positive electrode active material, a negative electrode, and a non-aqueous electrolyte.

According to an aspect of the present disclosure, there can be provided a positive electrode active material of a high energy density, containing a lithium-transition metal composite oxide having a large Ni content, which can contribute to improvement of a heat endurance characteristic while maintaining a superior rate characteristic of the non-aqueous electrolyte secondary battery. A non-aqueous electrolyte secondary battery according to an aspect of the present disclosure has a superior rate characteristic and superior heat endurance characteristic.

BRIEF DESCRIPTION OF DRAWINGS

FIG. 1 is a cross-sectional diagram of a non-aqueous electrolyte secondary battery according to an embodiment of the present disclosure.

DESCRIPTION OF EMBODIMENTS

The present inventors have undertaken research in order to solve the problem described above, and found that both superior rate characteristic and superior heat endurance characteristic can be realized by setting, in a lithium-transition metal composite oxide which contains Ni in an amount of greater than or equal to 80 mol %, a coverage ratio of B on surfaces of second particles having a smaller particle size to be higher than a coverage ratio of B on surfaces of first particles having a larger particle size.

As described above, in the lithium-transition metal composite oxide having a large Ni content, oxygen discharge tends to occur due to a secondary reaction with the electrolyte, and thus, there is a problem in the heat endurance characteristic during occurrence of abnormalities of the battery. In particular, a composite oxide of a small particle size has a large specific surface area per unit mass, and thus, tends to easily react with the electrolyte. On the other hand, if B is provided on the particle surface in order to inhibit the secondary reaction with the electrolyte, B becomes a resistance layer, resulting in degradation of the rate characteristic.

The present inventors have successfully improved the heat endurance characteristic while maintaining the superior rate characteristic, by setting a B coverage ratio on surfaces of second particles, which more significantly affect the heat endurance characteristic, to be higher than the B coverage ratio on surfaces of first particles, so as to inhibit the secondary reaction with the electrolyte on the side of the second particles during occurrence of abnormality of the battery, to thereby inhibit the oxygen discharge, while having a smaller amount of the resistance layer on the side of the first particles.

An embodiment of a positive electrode active material for a non-aqueous electrolyte secondary battery of the present disclosure and a non-aqueous electrolyte secondary battery which uses the positive electrode active material will be described below in detail. In the following, a circular tubular battery will be exemplified in which a wound-type electrode assembly 14 is housed in an outer housing can 16 having a circular tubular shape with a bottom, but the outer housing element is not limited to the outer housing can of the circular tubular shape, and may be, for example, an outer housing can of polygonal tubular shape, or an outer housing element formed from a laminated sheet including a metal layer and a resin layer. Further, the electrode assembly may alternatively be a layered electrode assembly in which a plurality of positive electrodes and a plurality of negative electrodes are alternately layered with a separator therebetween.

FIG. 1 is a cross-sectional diagram of a non-aqueous electrolyte secondary battery 10 according to an embodiment of the present disclosure. As exemplified in FIG. 1, the non-aqueous electrolyte secondary battery 10 comprises a wound-type electrode assembly 14, a non-aqueous electrolyte, and an outer housing can 16 which houses the electrode assembly 14 and the electrolyte. The electrode assembly 14 comprises a positive electrode 11, a negative electrode 12, and a separator 13, and has a wound structure in which the positive electrode 11 and the negative electrode 12 are wound in a spiral shape with the separator 13 therebetween. The outer housing can 16 is a metal container having a circular tubular shape with a bottom, with one side in an axial direction opened. The opening of the outer housing can 16 is closed by a sealing assembly 17. In the following, for the convenience of explanation, a side of the sealing assembly 17 of the battery will be described as an upper side, and a bottom side of the outer housing can 16 will be described as a lower side.

The non-aqueous electrolyte includes a non-aqueous solvent, and an electrolyte salt dissolved in the non-aqueous solvent. For the non-aqueous solvent, for example, esters, ethers, nitriles, amides, a mixture solvent of two or more of these solvents, or the like is used. The non-aqueous solvent may contain a halogen-substituted material in which at least some of hydrogen atoms of these solvents are substituted by a halogen atom such as fluorine. For the electrolyte salt, for example, lithium salts such as $LiPF_6$ is used. The electrolyte is not limited to liquid electrolyte, and may alternatively be a solid electrolyte which uses a gel-form polymer or the like.

The positive electrode 11, the negative electrode 12, and the separator 13 of the electrode assembly 14 are band-shaped, long-length elements, and are wound in a spiral shape, so as to be alternately layered in a radial direction of the electrode assembly 14. The negative electrode 12 is formed in a slightly larger size than the positive electrode 11, in order to prevent deposition of lithium. That is, the negative electrode 12 is formed longer in a long-length direction and in a width direction (short-length direction) than the positive electrode 11. Two separators 13 are formed at least with a slightly larger size than the positive electrode 11, and are placed, for example, to sandwich the positive electrode 11. The electrode assembly 14 has a positive electrode lead 20 connected to the positive electrode 11 by welding or the like, and a negative electrode lead 21 connected to the negative electrode 12 by welding or the like.

Insulating plates 18 and 19 are placed above and below the electrode assembly 14, respectively. In the example configuration of FIG. 1, the positive electrode lead 20 extends through a through hole of the insulating plate 18 to a side of the sealing assembly 17, and the negative electrode lead 21 extends through an outer side of the insulating plate 19 to a bottom side of the outer housing can 16. The positive electrode lead 20 is connected to a lower surface of an inner terminal plate 23 of the sealing assembly 17 by welding or the like, and a cap 27 which is a top plate of the sealing assembly 17 electrically connected to the inner terminal plate 23 is used as a positive electrode terminal. The negative electrode lead 21 is connected to an inner surface of the bottom of the outer housing can 16, and the outer housing can 16 is used as a negative electrode terminal.

A gasket 28 is provided between the outer housing can 16 and the sealing assembly 17, and a tightly-sealing property of an inside of the battery is secured. A groove portion 22 in which a portion of a side surface portion of the outer housing can 16 protrudes toward the inner side, and which supports the sealing assembly 17, is formed on the outer housing can 16. The groove portion 22 is desirably formed in an annular shape along a circumferential direction of the outer housing can 16, and supports the sealing assembly 17 with its upper surface. The sealing assembly 17 is fixed on an upper part of the outer housing can 16 by the groove portion 22, and an opening end of the outer housing can 16 swaged with respect to the sealing assembly 17.

The sealing assembly 17 has a structure in which the inner terminal plate 23, a lower vent member 24, an insulating member 25, an upper vent member 26, and the cap 27 are layered in this order from the side of the electrode assembly 14. The members of the sealing assembly 17 have, for example, a circular disk shape or a ring shape, and members other than the insulating member 25 are electrically connected to each other. The lower vent member 24 and the upper vent member 26 are connected to each other at central portions thereof, and the insulating member 25 is interposed between peripheral portions of the vent members. When an internal pressure of the battery increases due to abnormal heat generation, the lower vent member 24 deforms to press the upper vent member 26 upward toward the side of the cap 27 and is ruptured, so that a current path between the lower vent member 24 and the upper vent member 26 is disconnected. When the internal pressure is further increased, the upper vent member 26 ruptures, and gas is discharged from an opening of the cap 27.

The positive electrode 11, the negative electrode 12, and the separator 13 of the electrode assembly 14, in particular, a positive electrode active material of the positive electrode 11, will now be described in detail.

[Positive Electrode]

The positive electrode 11 comprises a positive electrode core 30 and a positive electrode mixture layer 31 provided on a surface of the positive electrode core 30. For the positive electrode core 30, a foil of a metal such as aluminum or the like, which is stable in a potential range of the positive electrode 11, a film on a surface layer of which the metal is placed, or the like may be used. The positive electrode mixture layer 31 includes a positive electrode active material, a binder material, and an electrically conductive material, and is desirably provided on both surfaces of the positive electrode core 30 except for a portion to which the positive electrode lead 20 is connected. The positive electrode 11 can be manufactured by, for example, applying a positive electrode combined material slurry including the positive electrode active material, the binder material, the electrically conductive material, and the like on the surface of the positive electrode core 30, drying the applied film, and compressing the dried film, to form the positive electrode mixture layer 31 on both surfaces of the positive electrode core 30.

As the electrically conductive material included in the positive electrode mixture layer 31, carbon materials may be exemplified, such as carbon black, acetylene black, Ketjen black, graphite, or the like. As the binder material included in the positive electrode mixture layer 31, a fluororesin such as polytetrafluoroethylene (PTFE) and polyvinylidene fluoride (PVdF), polyacrylonitrile (PAN), polyimide, an acrylic resin, polyolefin, or the like may be exemplified. Alternatively, these resins are used with a cellulose derivative such as carboxymethyl cellulose (CMC) or a salt thereof, polyethylene oxide (PEO), or the like.

The positive electrode active material includes a lithium-transition metal composite oxide containing nickel (Ni) in an amount of greater than or equal to 80 mol % with respect to a total number of moles of metal elements other than lithium (Li). In addition, boron (B) exists at least on a particle surface of the lithium-transition metal composite oxide. For convenience of the explanation, in the following, the lithium-transition metal composite oxide will be described as a "composite oxide (Z)". The positive electrode active material has the composite oxide (Z) as a primary component, and may be formed substantially from the composite oxide (Z) alone. In the positive electrode active material, composite oxides other than the composite oxide (Z) or other compounds may be contained, within a range which does not adversely affect the advantage of the present disclosure.

The composite oxide (Z) has a layer-form crystal structure, for example, a layer-form structure belonging to a space group R-3m or a layer-form structure belonging to a space group C2/m. In addition, in general, the composite oxide (Z) is a secondary particle formed by flocculation of a plurality of primary particles. A particle size of the primary particle is typically 0.05 µm~1 µm. The particle size of the primary particle is measured as a diameter of a circumcircle in a particle image observed by a scanning electron microscope (SEM).

A volume-based median size (D50) of the composite oxide (Z) is, for example, 3 µm~30 µm desirably, 5 µm~25 µm, and more desirably, 7 µm~15 µm. When the composite oxide (Z) is formed from the secondary particle, D50 of the composite oxide (Z) refers to D50 of the secondary particle. D50 means a particle size where an accumulated frequency in a volume-based granularity distribution reaches 50% from a side of lower particle size, and is also called a medium size. The granularity distribution of the composite oxide (Z) can be measured using a laser-diffraction-type granularity distribution measurement apparatus (for example, MT3000II manufactured by MicrotracBEL Corporation), and with water as a dispersion medium.

As described above, the composite oxide (Z) contains Ni in an amount of 80 mol % with respect to the total number of moles of metal elements other than Li. By setting the content of Ni to greater than or equal to 80 mol %, a battery of a high energy density can be obtained. An upper limit of the Ni content is desirably 95 mol %. When the Ni content exceeds 95 mol %, securing stability of the layer-form structure of the composite oxide (Z) becomes difficult, which may result in reduction of the cycle characteristic. A lower limit of the Ni content may be 85 mol % or 90 mol % with respect to the total number of moles of metal elements other than Li.

A content of B with respect to the total number of moles of metal elements other than Li in the composite oxide (Z) is desirably 0.1 mol %~5 mol %, more desirably, 0.2 mol %~3 mol %, and particularly desirably, 0.3 mol %~2 mol %. When the B content is within the above-described range, the particle cracking of the active material can be efficiently inhibited. B is desirably present at a high concentration on the particle surface (primary particle surface and secondary particle surface), rather than being solid-dissolved inside the particle (inside the primary particle) of the composite oxide (Z).

The composite oxide (Z) may contain metal elements other than Li, Ni, and B. As the other metal elements, Co, Mn, Al, Zr, B, Mg, Fe, Cu, Zn, Sn, Na, K, Ba, Sr, Ca, W, Mo, Nb, Ti, Si, and the like may be exemplified. Of these, the composite oxide (Z) desirably contains at least one of Co or Mn, and may further contain at least one metal element selected from elements of groups 4 to 6 (for example, Ti, Zr, V, Nb, Mo, W).

An example of the composite oxide (Z) which is desirable is a composite oxide represented by a general formula $Li_aNi_bCo_cMn_dMe_eB_fO_g$ (in the formula, $0.8 \leq a \leq 1.2$, $b \geq 0.80$, $c \leq 0.10$, $0.03 \leq d \leq 0.12$, $0 \leq e \leq 0.05$, $0.001 \leq f \leq 0.020$, $1 \leq g \leq 2$, $b+c+d+e+f=1$, and Me is at least one metal element selected from the elements of groups 4 to 6). Molar fractions of elements contained in the entirety of the particle of the composite oxide (Z) are measured by induction-coupled plasma (ICP) emission spectrometry.

In the composite oxide (Z), when particles having a larger particle size than a volume-based 70% particle size (D70) are first particles, and particles having a smaller particle size than a volume-based 30% particle size (D30) are second particles, a coverage ratio of B on surfaces of the second particles (hereinafter, referred to as "surface coverage ratio (S2)") is larger than a coverage ratio of B on surfaces of the first particles (hereinafter, referred to as "surface coverage ratio (S1)") by 5% or greater. The surface coverage ratio is a ratio of an area where B exist, over a total area of the particle surface. The surface coverage ratio of 100% means that an entire region of the particle surface is covered by B.

B may exist only on the surface of the second particle, but desirably, the surface coverage ratio (S1) is greater than 0 (S1>0), and B exists on the surfaces of both the first particle and the second particle. In the composite oxide (Z), by satisfying a condition of $(S2) \geq (S1) \times 1.05$, both superior rate characteristic and superior heat endurance characteristic can be realized. On the other hand, when the surface coverage ratios of the first particle and the second particle do not satisfy the condition, the rate characteristic and the heat endurance characteristic would be significantly reduced in comparison to the case in which the condition is met.

Here, D70 means a particle size in which an accumulated frequency in a volume-based granularity distribution become 70% from a side of smaller particle size. Similarly, D30 means a particle size in which the accumulated frequency in the volume-based granularity distribution becomes 30% from the side of smaller particle size. For example, D70 is 9 μm~19 μm, and D30 is 3 μm~13 μm.

The coverage ratios of B on the surfaces of the first particle and the second particle (surface coverage ratios S1 and S2) are calculated from a molar fraction of B with respect to a total number of moles of metal elements other than Li, which is measured by X-ray photoelectron spectrometry (XPS) (when the molar fraction of B is 1, the surface coverage ratio becomes 100%). Using XPS, elements on the particle surface are identified. The XPS measurement is performed in a state in which an illumination spot size of X-ray is set to 1 mmΦ or greater, and the first particle and the second particle are respectively selectively placed in the illumination spot. In this case, because a few hundreds of particles are included in the illumination spot, the molar fraction of B is measured as an average value of a plurality of particles.

So long as the surface coverage ratio of B measured by XPS satisfies the condition of (S2)≥(S1)×1.05, the second particles may include particles having the surface coverage ratio (S2) which is smaller than or equal to the surface coverage ratio of the first particle (S1). Further, the first particles may include particles having the surface coverage ratio (S1) which is greater than the surface coverage ratio of the second particle (S2).

B may be formed in a layer form to cover the surfaces of the first particle and the second particle, or may exist in an interspersed manner on the particle surfaces. Desirably, B does not completely cover the entire region of the particle surfaces. That is, on the surfaces of the first particle and the second particle, regions are present in which B does not exist. As described above, the first particle and the second particle are secondary particles in which a plurality of primary particles flocculate. Therefore, B exists on the secondary particle surfaces of the first particle and the second particle, and the surface coverage ratios (S1, S2) mean coverage ratios of B on the secondary particle surfaces. A portion of B may exist, for example, in the secondary particle, at an interface of the primary particles.

The surface coverage ratio (S2) of B on the surface of the second particle may be 100%, but is desirably less than 100%, more desirably 99% or less, and particularly desirably 98% or less. A lower limit value of the surface coverage ratio (S2) is desirably 60% or greater, more desirably 70% or greater, and particularly desirably 80% or greater. In this case, the heat endurance characteristic can be efficiently improved while inhibiting reduction of the rate characteristic. Examples of a desired range of the surface coverage ratio (S2) are 80%~98%, 85%~98%, and 90%~98%.

The surface coverage ratio (S1) of B on the surface of the first particle is desirably less than 90%, more desirably 85% or less, and particularly desirably 80% or less. A lower limit value of the surface coverage ratio (S1) is desirably 30% or greater, more desirably 40% or greater, and particularly desirably 50% or greater. In this case, the heat endurance characteristic can be efficiently improved while inhibiting reduction of the rate characteristic. Examples of a desired range of the surface coverage ratio (S1) are 50%~80%, 55%~80%, and 60%~80%.

A ratio (S2/S1) of the surface coverage ratio (S2) with respect to the surface coverage ratio (S1) is at least 1.05, and thus, as described above, (S2) is greater than (S1) by 5% or greater. The ratio (S2/S1) is desirably 1.1 or greater, and more desirably 1.3 or greater. There is no particular limit on an upper limit of the ratio (S2/S1), but the upper limit is, for example, 3. Examples of a desirable range of (S2/S1) are 1.1~1.5 and 1.2~1.4.

On the surfaces of the first particle and the second particle, B generally exists in a form of a boron compound containing B. The boron compound may contain Li. As will be described later, as a B source, a boron compound is used such as boric acid ($H_3BO_3$), boron oxide ($B_2O_3$), lithium borate ($LiBO_2$, $Li_2B_4O_7$), or the like. When boric acid or boron oxide is used as the B source, these compounds react with Li existing on the particle surface during baking, and boron compounds are produced which contain Li and B.

Thicknesses of the boron compound on the surfaces of the first particle and the second particle are desirably 100 μm or less, and more desirably 50 nm or less. Further, the thickness of the boron compound is more desirably 10 nm or less. An example of a desired thickness of the boron compound is 10 nm~50 nm. When the thickness of the boron compound is within this range, the heat endurance characteristic can be efficiently improved while inhibiting the reduction of the rate characteristic.

When the boron compound exists on the surfaces of the first particle and the second particle in a particulate form, in general, a particle size of the boron compound is smaller than a particle size of the primary particle of the first and second particles. The particle of the boron compound can be confirmed by SEM. The boron compound is desirably adhered uniformly over a wide range without being concentrated on a part of the surfaces of the first particle and the second particle.

A molar fraction of B (B2) with respect to the total number of moles of metal elements other than Li over the entirety of the second particle may be smaller than or equal to a molar fraction of B (B1) with respect to the total number of moles of metal elements other than Li over the entirety of the first particle, so long as the condition, surface coverage ratio (S2)≥surface coverage ratio (S1)×1.05, is satisfied. However, desirably, (B2) is greater than (B1) ((B2)>(B1)). When (B2)>(B1), the improvement effect of the rate characteristic and the heat endurance characteristic is more significant. Amounts of B contained in the first particle and the second particle are measured by ICP, as described above.

A ratio (B2/B1) of the molar fraction of B (B2) contained in the second particle with respect to the molar fraction of B (B1) contained in the first particle is desirably 1.1 or greater, and more desirably 1.5 or greater, and may be 3.0 or greater. There is no particular limit on an upper limit of the ratio (B2/B1), but the upper limit is, for example, 10. An example of a desirable range of (B2/B1) is 1.5~3.5.

The composite oxide (Z) may be manufactured, for example, through the following process.

A lithium source such as lithium hydroxide is added to two types of nickel compounds (X1) and (X2) containing at least Ni, not containing Li and B, and having different D50 values, and the resulting substances are then baked, to synthesize lithium-nickel composite oxides (Y1) and (Y2) having different D50 (step 1). Examples of the nickel compound include a composite oxide or a hydroxide containing Ni, Co, and Mn. The D50 of the nickel compound is higher in (X1) ((X1)>(X2)).

Alternatively, the lithium-nickel composite oxides (Y1) and (Y2) may be obtained by classifying one type of lithium-nickel composite oxide. For the classification, a method known in the field may be applied. Alternatively, the obtained lithium-nickel composite oxides (Y1) and (Y2) may be washed with water. With the water washing, an amount of Li existing on the particle surface of the composite oxide can be reduced, and also, an amount of Li existing inside the particle can be reduced, resulting in a gap being formed inside the water-washed composite oxide particles.

Next, a source of B (B source) is added to each of the lithium-nickel composite oxides (Y1) and (Y2), to form composites of boron on the particle surfaces, and then, the resulting substances are baked to synthesize lithium-transition metal composite oxides (Z1) and (Z2) (step 2). Then, the composite oxides (Z1) and (Z2) are mixed, to obtain the composite oxide (Z). As the B source, for example, boric acid ($H_3BO_3$), boron oxide ($B_2O_3$), lithium borate ($LiBO_2$, $Li_2B_4O_7$), or the like may be employed. For forming the composite, a dry particle composing apparatus (for example, NOB-130 manufactured by Hosokawa Micron Corporation) may be used. Alternatively, in this process, a lithium source such as lithium hydroxide may be added along with the B source.

In the step 2 described above, an amount of addition of the B source with respect to the lithium-nickel composite oxide (Y2) having a smaller D50 is set larger than an amount of addition of the B source with respect to the lithium-nickel composite oxide (Y1) having a larger D50, so that the molar fraction of B contained in the second particle of the composite oxide (Z) can be set larger than the molar fraction of B contained in the first particle.

With an adjustment of baking temperatures for the composite oxides (Y1) and (Y2), coverage ratios of B and thicknesses of B on the surfaces of the first particle and of the second particle of the composite oxide (Z) can be adjusted. By baking the composite oxides (Y1) and (Y2) at a high temperature along with the B source, composite oxides with a low surface coverage ratio of B may be synthesized. By baking the composite oxides (Y1) and (Y2) at a low temperature along with the B source, composite oxides with a high surface coverage ratio of B may be synthesized. Here, the "high temperature" is, for example, 350° C.-500° C., and the "low temperature" is, for example, 200° C.-325° C.

[Negative Electrode]

The negative electrode 12 comprises a negative electrode core 40, and a negative electrode mixture layer 41 provided on a surface of the negative electrode core 40. For the negative electrode core 40, a foil of metal, such as copper, which is stable within a potential range of the negative electrode 12, a film on a surface layer of which the metal is placed, or the like may be used. The negative electrode mixture layer 41 includes a negative electrode active material and a binder material, and is desirably provided, for example, on both surfaces of the negative electrode core 40 other than a portion to which the negative electrode lead 21 is connected. The negative electrode 12 can be manufactured, for example, by applying a negative electrode combined material slurry including the negative electrode active material, the binder material, or the like on a surface of the negative electrode core 40, drying the applied film, and compressing the dried film to form the negative electrode mixture layer 41 on both surfaces of the negative electrode core 40.

The negative electrode mixture layer 41 includes, as the negative electrode active material, for example, a carbon-based active material which reversibly occludes and releases lithium ions. Examples of desirable carbon-based active materials include a natural graphite such as scaly graphite, massive graphite, and earthy graphite, and an artificial graphite such as massive artificial graphite, and graphitized mesophase carbon microbeads (MCMB). Further, for the negative electrode active material, a Si-based active material formed from at least one of Si or a Si-containing compound may be used, or both the carbon-based active material and the Si-based active material may be used.

For the binder material included in the negative electrode mixture layer 41, similar to the positive electrode 11, the fluororesin, PAN, the polyimide, the acryl resin, polyolefin, or the like, may be used, and desirably, styrene-butadiene rubber (SBR) is used. In addition, desirably, the negative electrode mixture layer 41 further comprises CMC or a salt thereof, polyacrylic acid (PAA) or a salt thereof, polyvinyl alcohol (PVA), and the like. In particular, desirably, all of SBR, CMC or a salt thereof, and PAA or a salt thereof, are employed together.

[Separator]

For the separator 13, a porous sheet having an ion penneating characteristic and an insulating characteristic is used. Specific examples of the porous sheet include a microporous thin film, a woven fabric, and a non-woven fabric. As the material of the separator 13, desirably, polyolefin such as polyethylene and polypropylene, a cellulose, or the like is used. The separator 13 may have a single-layer structure or a layered structure. On a surface of the separator, a heat resisting layer or the like may be formed.

EXAMPLES

The present disclosure will further be described with reference to Examples. However, the present disclosure is not limited to these Examples.

Example 1

[Synthesis of Positive electrode Active Material]

A nickel-cobalt-manganese composite hydroxide having a D50 of 12 μm and a composition of $Ni_{0.85}Co_{0.08}Mn_{0.07}(OH)_2$, and a nickel-cobalt-manganese composite hydroxide having a D50 of 8 μm and a composition of $Ni_{0.85}Co_{0.08}Mn_{0.07}(OH)_2$, both obtained by coprecipitation, were each baked at 500° C., and nickel-cobalt-manganese composite oxides (X1) and (Y1) were obtained. Here, $D_{50}$ of composite oxide (X1)>D50 of composite oxide (Y1).

Then, lithium hydroxide and the nickel-cobalt-manganese composite oxide (X1) were mixed with a molar ratio of Li to a total amount of Ni, Co, and Mn of 1.08:1. The mixture was baked under an oxygen atmosphere at a temperature of 700° C. for 8 hours, and was ground, to obtain a lithium composite oxide (X2) having a large D50. No water-washing was performed on the obtained lithium composite oxide (X2).

In addition, lithium hydroxide and the nickel-cobalt-manganese composite oxide (Y1) were mixed with a molar ratio of Li to a total amount of Ni, Co, and Mn of 1.08:1. The mixture was baked under an oxygen atmosphere at a temperature of 700° C. for 8 hours, and was ground, to obtain a lithium composite oxide (Y2) having a small D50. No water-washing was performed on the obtained lithium composite oxide (Y2).

Next, the lithium composite oxide (X2) and boric acid ($H_3BO_3$) were dry-mixed with a molar ratio of a total amount of Ni, Co, and Mn to B in $H_3BO_3$ of 1:0.01. The mixture was baked under atmospheric air, at a temperature of 400° C., for 3 hours, and was ground, to obtain a lithium composite oxide (X3) in which B exists on a particle surface.

The lithium composite oxide (Y2) and $H_3BO_3$ were dry-mixed with a molar ratio of a total amount of Ni, CO, and Mn to B in $H_3BO_3$ of 1:0.01. The mixture was baked under atmospheric air, at a temperature of 300° C., for 3, hours, and was ground, to obtain a lithium composite oxide (Y3) in which B exists on a particle surface.

Next, the lithium composite oxides (X3) and (Y3) were mixed with a mass ratio of 1:1, to obtain a positive electrode active material. In a granularity distribution of the positive electrode active material, D50 was 12 μm, D70 was 14 μm, and D30 was 10 μm.

A composition of the positive electrode active material was analyzed with ICP, and was $Li_{1.01}Ni_{0.84}Co_{0.08}Mn_{0.07}B_{0.01}O_2$. From the result of ICP, a molar fraction of B (B amount) with respect to a total number of moles of metal elements (Ni, Co, Mn, B) other than Li was 1.0 mol % for first particles having a particle size greater than D70, and also for second particles having a particle size smaller than D30.

Coverage ratios of B on the surfaces of the first particle and the second particle were calculated by measuring, by XPS, the numbers of moles of Ni, Co, Mn, and B on the surface of the secondary particle, and calculating from molar fractions of B with respect to the total number of moles of Ni, Co, and Mn. The surface coverage ratio of B was 71% for the first particle, and 951% for the second particle.

[Manufacturing of Positive Electrode]

The above-described positive electrode active material, acetylene black, and polyvinylidene fluoride (PVdF) were mixed at a solid mass ratio of 96.3:2.5:1.2, a proper amount of N-methyl-2-pyrrolidone (NMP) was added, and the mixture was kneaded, to prepare positive electrode combined material slurry. The positive electrode combined material slurry was applied on both surfaces of a positive electrode core formed from an aluminum foil, the applied film was dried, the applied film was then rolled using a roller, and the resulting structure was cut in a predetermined electrode size, to obtain a positive electrode in which the positive electrode mixture layer was formed on both surfaces of the positive electrode core. An exposed portion in which a surface of the positive electrode core is exposed was provided at a portion of the positive electrode.

[Manufacturing of Negative Electrode]

As the negative electrode active material, natural graphite was used. The negative electrode active material, sodium carboxymethyl cellulose (CMC-Na), and styrene-butadiene rubber (SBR) were mixed in an aqueous solution with a solid mass ratio of 100:1:1, to prepare a negative electrode combined material slurry. The negative electrode combined material slurry was applied on both surfaces of a negative electrode core formed from a copper foil, the applied film was dried, the applied film was then rolled using a roller, and the resulting structure was cut in a predetermined electrode size, to obtain a negative electrode in which the negative electrode mixture layer was formed on both surfaces of the negative electrode core. An exposed portion in which a surface of the negative electrode core is exposed was provided at a portion of the negative electrode.

[Preparation of Non-aqueous Electrolyte]

Into a mixed solvent in which ethylene carbonate (EC), ethyl-methyl carbonate (EMC), and dimethyl carbonate (DMC) were mixed with a volume ratio of 3:3:4, lithium hexafluomphosphate ($LiPF_6$) was dissolved in a concentration of 1.0 mole/liter. Further, vinylene carbonate (VC) was dissolved into the above-described mixed solvent with a concentration of 2.0 percent by mass, to prepare a non-aqueous electrolyte.

[Manufacturing of Battery]

An aluminum lead was attached to the exposed portion of the above-described positive electrode, and a nickel lead was attached to the exposed portion of the above-described negative electrode, the positive electrode and the negative electrode ware rolled in a spiral shape with a separator made of polyolefin therebetween, and then, the wound structure was press-molded in a radial direction, to form a wound-type electrode assembly having a flat shape. The electrode assembly was housed in an outer housing element formed from an aluminum laminated sheet, the above-described non-aqueous electrolyte was injected, and an opening of the outer housing element was sealed, to obtain a non-aqueous electrolyte secondary battery having a design capacity of 650 mAh.

Example 2

A positive electrode active material and a non-aqueous electrolyte secondary battery were manufactured in a similar manner to Example 1, except that the lithium composite oxides (X2) and (Y2) were water-washed after the lithium composite oxides (X2) and (Y2) were synthesized.

<Example 3>

A positive electrode active material and a non-aqueous electrolyte secondary battery were manufactured in a similar manner to Example 1, except that the lithium composite oxide (X3) was synthesized by dry-mixing the lithium composite oxide (X2) and $H_3BO_3$ with a molar ratio of the total amount of Ni, Co, and Mn to B in $H_3BO_3$ of 1:0.015, and the lithium composite oxide (Y3) was synthesized by dry-mixing the lithium composite oxide (Y2) and $H_3BO_3$ with a molar ratio of the total amount of Ni, Co, and Mn to B in $H_3BO_3$ of 1:0.005.

Comparative Example 1

A positive electrode active material and a non-aqueous electrolyte secondary battery were manufactured in a similar manner to Example 1, except that a baking temperature during synthesis of the lithium composite oxide (X3) was changed to 300° C.

Comparative Example 2

A positive electrode active material and a non-aqueous electrolyte secondary battery were manufactured in a similar manner to Example 1, except that a baking temperature during synthesis of the lithium composite oxide (Y3) was changed to 400° C.

For the batteries of the Examples and the Comparative Examples, a rate characteristic and a heat endurance characteristic were evaluated. A result of evaluation is shown on Table 1. Table 1 also shows a molar fraction of B with respect to a total number of moles of metal elements other than Li and the surface coverage ratio of B, for the first particle and for the second particle.

[Evaluation of Rate Characteristic]

The batteries of the Examples and the Comparative Examples were charged under a temperature environment of 25° C., with a constant current of 0.5 It, and until a battery voltage reached 4.2V, and constant-voltage charging was performed at 4.2V, until a current value reached 0.02 It. Then, the batteries were left to stand for 15 minutes. Then, constant-current discharging was performed at 0.05 It until the battery voltage reached 2.5V, and a discharge capacity C1 at 0.05It was measured. Then, constant-voltage charging was performed at 4.2V, until the current value reached 0.02 It, and then, the batteries were left to stand for 15 minutes. Then, constant-current discharging was performed at 2 It until the battery voltage reached 2.5V, and a discharge capacity C2 at 2 It was measured. The rate characteristic was calculated by the following formula.

[Evaluation of Heat Endurance Characteristic (ARC Test)]

The batteries of the Examples and the Comparative Examples were charged under an environment of 25° C., at a constant current of 0.3 It until the battery voltage reached 4.2V, and then, were charged at a constant voltage of 4.2V until the current value reached 0.05 It, to give a charged state. Then, in a device of an accelerating rate calorimeter (ARC), the temperature of the battery was increased to 130° C., and a self-heat-generation rate (° C./min) of the battery under an adiabatic environment was measured by observing the battery temperature with a thermocouple attached to a flat surface portion of the battery. A battery temperature at which the self-heat generation rate of the battery reached 10° C./rain was defined as a thermal runaway temperature.

comparison to the batteries of the Comparative Examples. Further, when the amount of B contained in the second particle is larger than the amount of B contained in the first particle (Example 3), a particularly superior advantage was achieved.

REFERENCE SIGNS LIST 10 non-aqueous electrolyte secondary battery
11 positive electrode
12 negative electrode
13 separator
14 electrode assembly
16 outer housing can
17 sealing assembly
18, 19 insulating plate
20 positive electrode lead
21 negative electrode lead
22 groove portion
23 inner terminal plate
24 lower vent member
25 insulating member
26 upper vent member
27 cap
28 gasket
30 positive electrode core
31 positive electrode mixture layer
40 negative electrode core
41 negative electrode mixture layer

TABLE 1

| | MANUFACTURING METHOD | | | POSITIVE ELECTRODE ACTIVE MATERIAL | |
| --- | --- | --- | --- | --- | --- |
| | | FIRST | SECOND | FIRST PARTICLE | |
| | BOTH WATER-WASH | PARTICLE BAKING TEMPERATURE | PARTICLE BAKING TEMPERATURE | B AMOUNT (mol %) | SURFACE COVERAGE RATIO (%) |
| EXAMPLE 1 | NO | 400° C. | 300° C. | 1.0 | 71 |
| EXAMPLE 2 | YES | 400° C. | 300° C. | 1.0 | 70 |
| EXAMPLE 3 | NO | 400° C. | 300° C. | 0.5 | 71 |
| COMPARA-TIVE EXAMPLE 1 | NO | 300° C. | 300° C. | 1.0 | 96 |
| COMPARA-TIVE EXAMPLE 2 | NO | 400° C. | 400° C. | 1.0 | 71 |

| | POSITIVE ELECTRODE ACTIVE MATERIAL SECOND PARTICLE | | EVALUATION | |
| --- | --- | --- | --- | --- |
| | B AMOUNT (mol %) | SURFACE COVERAGE RATIO (%) | RATE CHARACTERISTIC (%) | THERMAL RUNAWAY TEMPERATURE (%) |
| EXAMPLE 1 | 1.0 | 95 | 87 | 169 |
| EXAMPLE 2 | 1.0 | 95 | 83 | 169 |
| EXAMPLE 3 | 1.5 | 95 | 90 | 175 |
| COMPARA-TIVE EXAMPLE 1 | 1.0 | 96 | 53 | 153 |
| COMPARA-TIVE EXAMPLE 2 | 1.0 | 71 | 65 | 148 |

As shown in Table 1, the batteries of the Examples have a superior rate characteristic in comparison to the batteries of the Comparative Examples. The batteries of the Examples also have a low thermal nmaway temperature in the ARC test, and, consequently, a superior heat endurance characteristic during occurrence of abnormality in the battery in

The invention claimed is:

1. A positive electrode active material for a non-aqueous electrolyte secondary battery, comprising:

a lithium-transition metal composite oxide containing nickel (Ni) in an amount of greater than or equal to 80 mol % with respect to a total number of moles of metal elements other than lithium (Li), wherein boron (B) is present at least on a particle surface of the lithium-transition metal composite oxide, wherein the lithium-transition metal composite oxide is a secondary particle formed by flocculation of a plurality of primary particles;

the secondary particle comprises a plurality of secondary particles wherein those having a larger particle size than a volume-based 70% particle size (D70) are defined as first particles, those having a smaller particle size than a volume-based 30% particle size (D30) are defined as second particles;

a coverage ratio of B on surfaces of the second particles is larger than a coverage ratio of B on surfaces of the first particles by 5% or greater, the coverage ratio being a ratio of an area of surfaces on which B is present to a total area of surfaces of each of the secondary particles.

2. The positive electrode active material for a non-aqueous electrolyte secondary battery according to claim 1, wherein the lithium-transition metal composite oxide is a composite oxide represented by a general formula $Li_aNi_bCo_cMn_dMe_eB_fO_g$ (in the formula, $0.8 \leq a \leq 1.2$, $b \geq 0.80$, $c \leq 0.10$, $0.03 \leq d \leq 0.12$, $0 \leq e \leq 0.05$, $0.001 \leq f \leq 0.020$, $1 \leq g \leq 2$, $b+c+d+e+f=1$, and Me is at least one metal element selected from elements of groups 4 to 6).

3. The positive electrode active material for a non-aqueous electrolyte secondary battery according to claim 1, wherein B is present on the surfaces of the first particle and the second particle in a form of a boron compound containing Li and B.

4. The positive electrode active material for a non-aqueous electrolyte secondary battery according to claim 1, wherein the coverage ratio of B on the surfaces of the second particles is 80% ~98%.

5. The positive electrode active material for a non-aqueous electrolyte secondary battery according to claim 1, wherein the coverage ratio of B on the surfaces of the first particle is 50% ~80%.

6. The positive electrode active material for a non-aqueous electrolyte secondary battery according to claim 1, wherein a molar fraction of B with respect to a total number of moles of metal elements other than Li in the second particle is larger than a molar fraction of boron with respect to a total number of moles of metal elements other than Li in the first particle.

7. A non-aqueous electrolyte secondary battery comprising:

a positive electrode having the positive electrode active material according to claim 1;

a negative electrode; and a non-aqueous electrolyte.

* * * * *